P. KESSLER.
Plow-Point.

No. 209,406.　　　　　　Patented Oct. 29, 1878.

Witnesses:
W. A. Hamilton
W. Burris

Inventor:
Peter Kessler
by G. B. Towles
　Attorney

UNITED STATES PATENT OFFICE.

PETER KESSLER, OF BUTLER, MARYLAND, ASSIGNOR OF ONE-HALF HIS RIGHT TO THOMAS W. DAVIS, OF SAME PLACE.

IMPROVEMENT IN PLOW-POINTS.

Specification forming part of Letters Patent No. 209,406, dated October 29, 1878; application filed April 20, 1878.

*To all whom it may concern:*

Be it known that I, PETER KESSLER, of Butler, in the county of Baltimore and State of Maryland, have invented certain new and useful Improvements in Plow-Points; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
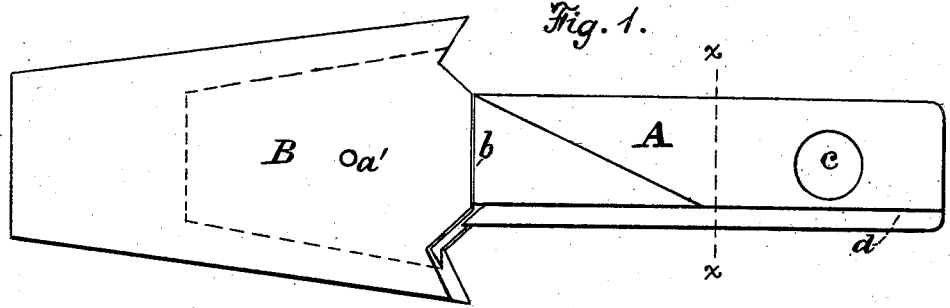
Figure 2:
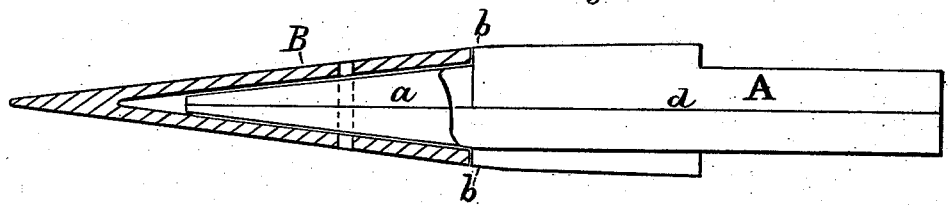
Figure 3:
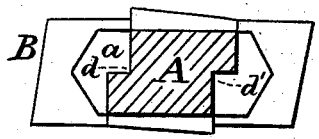

Figure 1 is a plan view of my improved plow-point; Fig. 2, a view showing the shield or point in section; and Fig. 3, a transverse section taken in the line $x\,x$ of Fig. 1.

This invention relates to reversible plow-points; and it consists of a reversible shank or stem having a tenon formed with a shoulder on each side, to receive a reversible shield or point secured by a rivet to the tenon, so as to save the shank, instead of throwing it aside when the point is worn out, and permit the shield to be reversed when the under edge is worn away, as well as the shank, when required, as will be hereinafter more fully explained.

A is the shank, made separate from the share, and having the tenon $a$ formed with shoulders $b\,b$. The tenon is made to taper like a wedge with beveled edges. B is the shield, cast with a mortise or hollow corresponding with the form of the tenon, and made to fit snugly thereon and come squarely against the shoulders. The tenon and shield are each provided with a hole, through which is passed a pin, $a'$, to secure the shield to the tenon.

The shank is provided with a bolt-hole, $c$, and a rabbet, $d\,d'$, on each side thereof, by which the shank is attached to the under side of the plow in the usual manner, and may be reversed when required, thus rendering the shank as well as the shield reversible.

To reverse either when the under side of the shield is worn away, take out the pin and withdraw the shield from the tenon and turn it over on the other side, and slip it onto the tenon again, and secure it, as before, with the pin. If the shank should require reversing, remove the bolt and turn the shank over and secure it with the bolt, as before.

I am aware of the patents to D. J. Selden, May 21, 1867, No. 64,914, M. M. Bowers, July 20, 1875, No. 165,703, and C. W. Jenkins, October 16, 1877, No. 196,232, all showing reversible plow-points. I therefore do not claim, broadly, a reversible plow-point; but What I do claim, and desire to secure by Letters Patent, is—

The combination of the shank A, made separate from the share and reversible, and provided with the tenon $a$ and bolt-hole $c$, with the reversible shield B, secured on the tenon by the pin $a'$, constructed and adapted substantially in the manner and for the purpose as herein shown and set forth.

In testimony that I claim the foregoing as my own invention I affix my signature in presence of two witnesses.

PETER KESSLER.

Witnesses:
H. A. DANIELS,
WM. H. CHASE.